(12) United States Patent
Okui et al.

(10) Patent No.: US 10,166,897 B2
(45) Date of Patent: Jan. 1, 2019

(54) SEAT

(71) Applicant: DELTA KOGYO CO., LTD., Hiroshima (JP)

(72) Inventors: Takahiro Okui, Hiroshima (JP); Katsumi Sumoto, Hiroshima (JP); Yuji Sato, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 0 days.

(21) Appl. No.: 15/526,865

(22) PCT Filed: Dec. 10, 2015

(86) PCT No.: PCT/JP2015/084608
§ 371 (c)(1),
(2) Date: May 15, 2017

(87) PCT Pub. No.: WO2016/098672
PCT Pub. Date: Jun. 23, 2016

(65) Prior Publication Data
US 2017/0327021 A1   Nov. 16, 2017

(30) Foreign Application Priority Data

Dec. 16, 2014   (JP) ................. 2014-254019

(51) Int. Cl.
*B60N 2/72* (2006.01)
*A47C 31/02* (2006.01)
*A47C 7/28* (2006.01)
*B60N 2/70* (2006.01)
*B68G 7/052* (2006.01)
*B60N 2/68* (2006.01)

(52) U.S. Cl.
CPC .................. *B60N 2/72* (2013.01); *A47C 7/28* (2013.01); *A47C 31/02* (2013.01); *B60N 2/68* (2013.01); *B60N 2/70* (2013.01); *B60N 2/7011* (2013.01); *B68G 7/052* (2013.01)

(58) Field of Classification Search
CPC .......... B60N 2/72; B60N 2/68; B60N 2/7011; A47C 31/02; A47C 7/28
USPC ...................................... 297/218.3
See application file for complete search history.

(56) References Cited

U.S. PATENT DOCUMENTS

| | | |
|---|---|---|
| 2013/0134749 A1 | 5/2013 | Awata et al. |
| 2014/0049090 A1 | 2/2014 | Mori et al. |
| 2014/0125108 A1 | 5/2014 | Kurashita |

FOREIGN PATENT DOCUMENTS

| | | |
|---|---|---|
| JP | S48-37539 Y1 | 11/1973 |
| JP | S53-39605 U | 4/1978 |
| JP | S61-23900 U | 2/1986 |

(Continued)

OTHER PUBLICATIONS

European Search Report dated Oct. 20, 2017.
International Search Report dated Feb. 16, 2016.

*Primary Examiner* — Mark R Wendell
(74) *Attorney, Agent, or Firm* — Gerald E. Hespos; Michael J. Porco; Matthew T. Hespos

(57) ABSTRACT

A vehicle seat (1) includes a seat frame (6), an elastic sheet (9) mounted to the seat frame in a tensioned state (6), and a trim (10) provided on the elastic sheet (9). The elastic sheet (9) includes a fastening section including a fastening plate (16) for the trim (10). The trim (10) includes a trim body (11) and a trim end (15) that is attached to the trim body (11) and fastened to the fastening plate (16) with the trim body (11) being stretched.

5 Claims, 5 Drawing Sheets

(56) References Cited

FOREIGN PATENT DOCUMENTS

| | | |
|---|---|---|
| JP | 2000116460 A | 4/2000 |
| JP | 2001061607 A | 3/2001 |
| JP | 2004008488 A | 1/2004 |
| JP | 4066034 B2 | 3/2008 |
| JP | 2012035811 A | 2/2012 |
| JP | 2014094076 A | 5/2014 |
| JP | H7-3500 U | 1/2017 |
| WO | 2012150633 | 11/2012 |

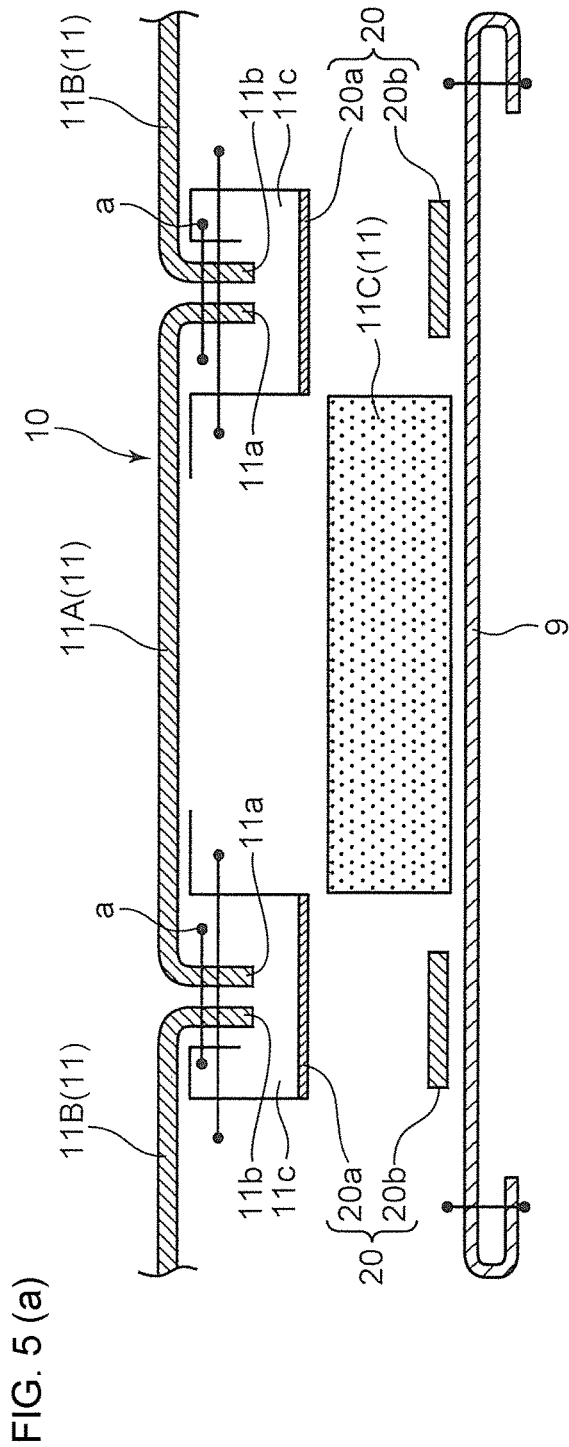
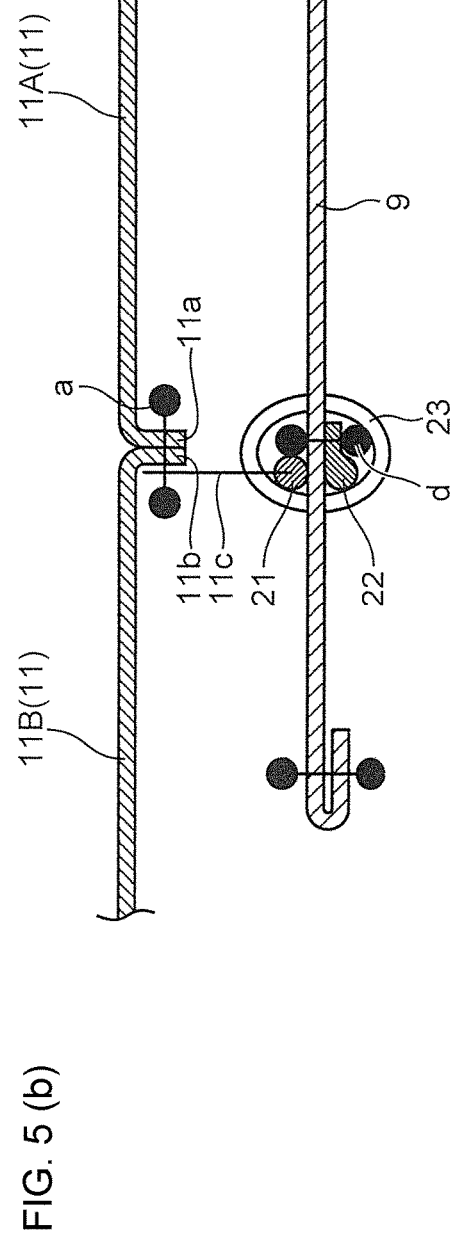
FIG. 5 (a)
FIG. 5 (b)

SEAT

TECHNICAL FIELD

The present invention relates to a seat including an elastic sheet mounted to a seat frame in a tensioned state.

BACKGROUND ART

A typical vehicle seat includes a seat frame, a cushion pad (cushion material) attached to the seat frame, and a trim (surface cover) that covers the cushion pad. In recent years, a seat having an elastic sheet mounted to a seat frame in a tensioned state has also been developed (see JP 2014-94076 A). Using the elastic sheet, that has a cushioning property, the cushion pad can be made thin, which advantageously enables the whole seat to be made thin.

Meanwhile, a trim is usually fastened to the seat frame with a portion of the trim being stretched. Specifically, a wire of a pull-in cloth connected to a pull-in section of the trim is connected to a wire provided in the cushion pad with a hook ring (connecting attachment) (see JP 2001-61607 A).

The trim of a vehicle seat including such an elastic sheet as disclosed in JP 2014-94076 A is configured in a similar manner, but has a problem as described below. The structure disclosed in JP 2001-61607 A is suitable for a seat with a thick cushion pad which needs to be provided with a wire for the pull-in cloth, a wire for the seat frame, and a deep pull-in groove that accommodates the hook ring.

It is difficult to provide a deep pull-in groove in a seat having an elastic sheet that is provided to reduce the thickness of the cushion pad as disclosed in JP 2014-94076 A, so that it is disadvantageously difficult to pull in the trim with the trim being sufficiently stretched.

Instead of pulling in the trim, the trim and the elastic sheet may previously be sewed together to form a desired shape. However, sewing together the trim and the elastic sheet makes it difficult to attach the elastic sheet to the seat frame. For a seat designed to have an embedded heater or an embedded sensor, the trim should be designed for each seat design. There are further problems that, for example, once the elastic sheet is attached to the seat frame, the trim cannot be adjusted to flatten crimps.

SUMMARY OF INVENTION

An object of the present invention is to provide a technique of easily and suitably pull in a trim of a seat having an elastic sheet.

A seat according to the present invention includes a seat frame, an elastic sheet mounted to the seat frame in a tensioned state, and a trim provided on the elastic sheet, where the elastic sheet includes a fastening section for the trim, the trim includes a trim body and a fastened portion that is attached to the trim body and fastened to the fastening section with the trim body being stretched.

BRIEF DESCRIPTION OF THE DRAWINGS

FIG. 1(*b*) is a perspective view of a main part of a frame of the vehicle seat.

FIG. 3(*b*) is a plan view illustrating the trim end fastened to the fastening plate.

FIG. 4(*b*) is an exploded perspective view of the trim fastening structure where an insertion piece is not yet fastened.

FIG. 5(*a*) is a sectional view illustrating another exemplary modification of the trim fastening structure. FIG. 5(*b*) is a sectional view illustrating yet another exemplary modification of the trim fastening structure.

DESCRIPTION OF EMBODIMENTS

Figure 1:
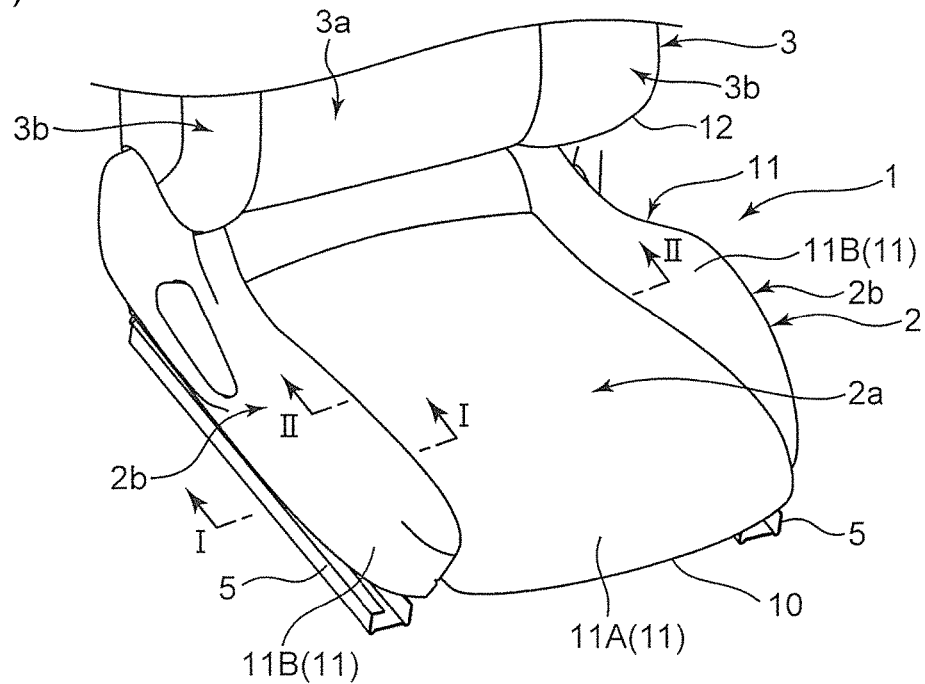
FIG. 1(*a*) is a perspective view of a main part of a vehicle seat according to an embodiment of the present invention.
Figure 1:
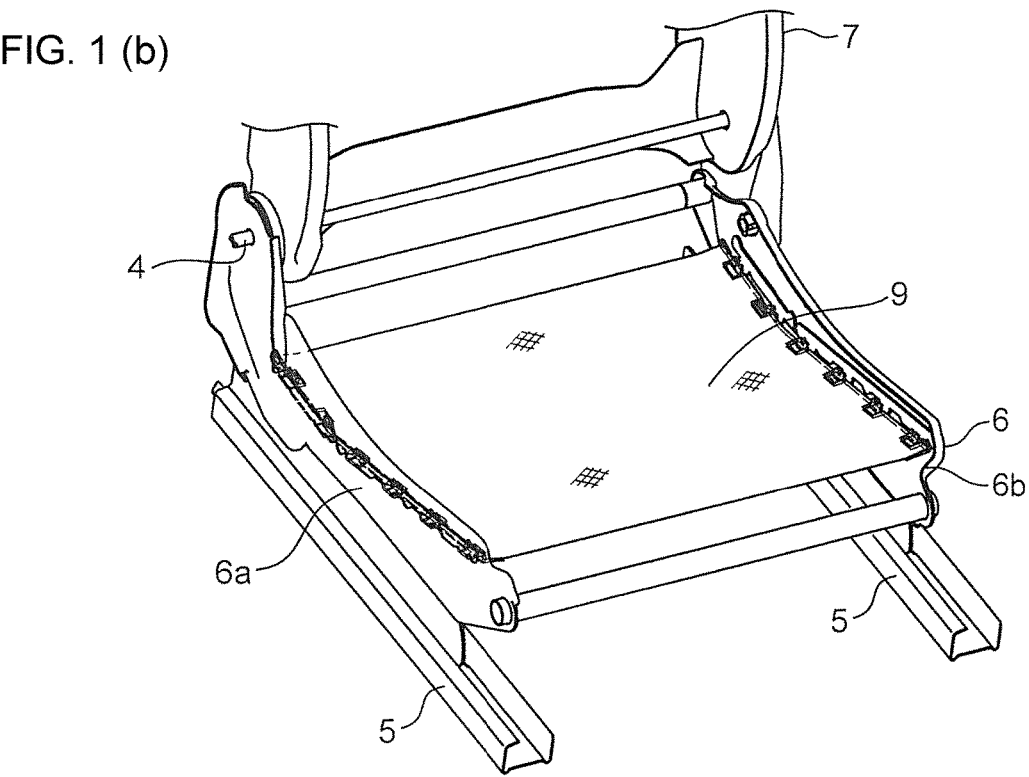

An embodiment of the present invention will now be described below in detail with reference to the drawings. FIG. 1(*a*) is a perspective view of a main part of a vehicle seat 1, and FIG. 1(*b*) is a perspective view of a main part of frames 6 and 7 of the vehicle seat 1.

The vehicle seat 1 (hereinafter abbreviated as seat 1) includes a seat cushion 2 and a seat back 3. The seat back 3 is supported on the seat cushion 2 to be able to tilt back and forth by a reclining mechanism (not shown) including a reclining shaft 4.

A slider 5 is attached to each of the left and right bottoms of the seat cushion 2 to adjust the front-back position of the seat 1.

A seat frame 6 is provided inside the seat cushion 2, and a seat frame 7 is provided inside the seat back 3. Hereinafter, the seat frames 6 and 7 are abbreviated as frames 6 and 7, respectively.

On the frame 6, an elastic sheet 9 having cushioning property is disposed in a position that corresponds to a seating face 2*a* of the seat cushion 2, and cushion pads 8 protruding upright (see FIG. 2) are disposed in positions that correspond to both side portions 2*b*. The elastic sheet 9 and the cushion pads 8 are covered with a trim (surface cover) 10.

On the frame 7, a cushion pad (not shown) is disposed in a position that corresponds to a back supporting face 3*a* and both side portions 3*b* of the seat back 3, and the back supporting face 3*a* and both the side portions 3*b* are covered with a trim (surface cover) 12.

The frame 6 of the seat cushion 2 includes a right frame 6*a* and a left frame 6*b*. The elastic sheet 9 is mounted across the right frame 6*a* and the left frame 6*b* in a planar shape in a tensioned state. The elastic sheet 9 is composed of a stretchable net and also called a cushion base net. An example of the elastic sheet 9 is disclosed in JP 2000-116460 A as "elastic net-sheet" and will not be described in detail. The elastic sheet 9 is required to have flexibility (cushioning property) but is not necessarily a net.

Figure 2:
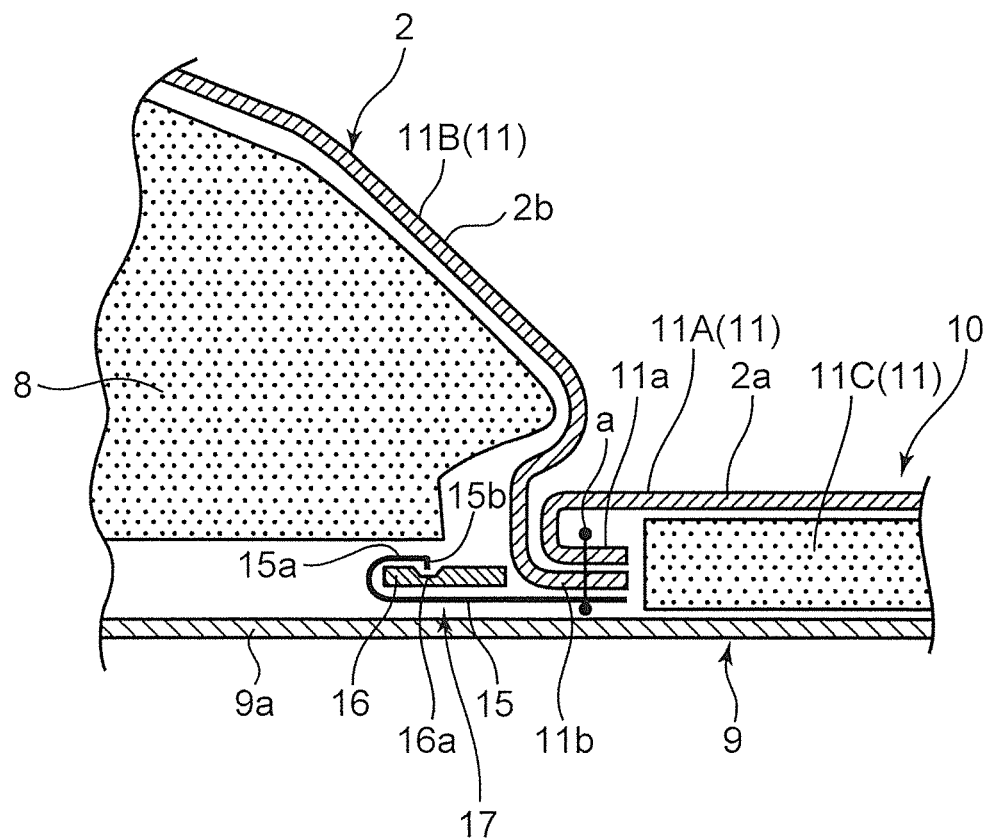
FIG. 2 is a sectional view taken along the line I-I in FIG. 1(*a*) and illustrating a trim fastening structure of the vehicle seat.
Figure 3:
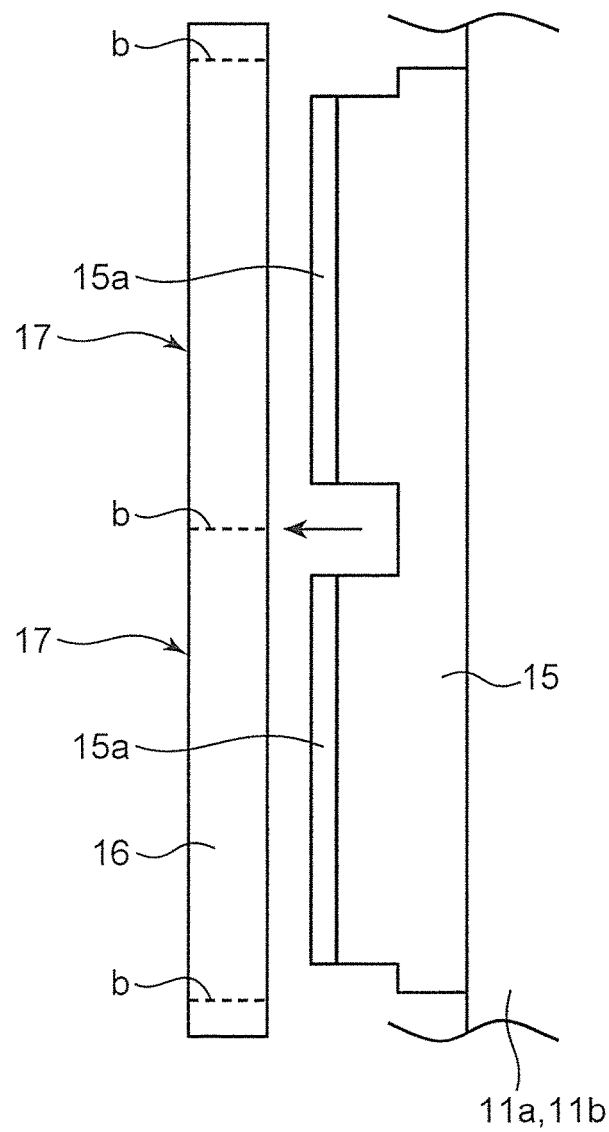
FIG. 3(*a*) is a plan view of the trim fastening structure where a trim end and a fastening plate are not yet fastened.
Figure 3:
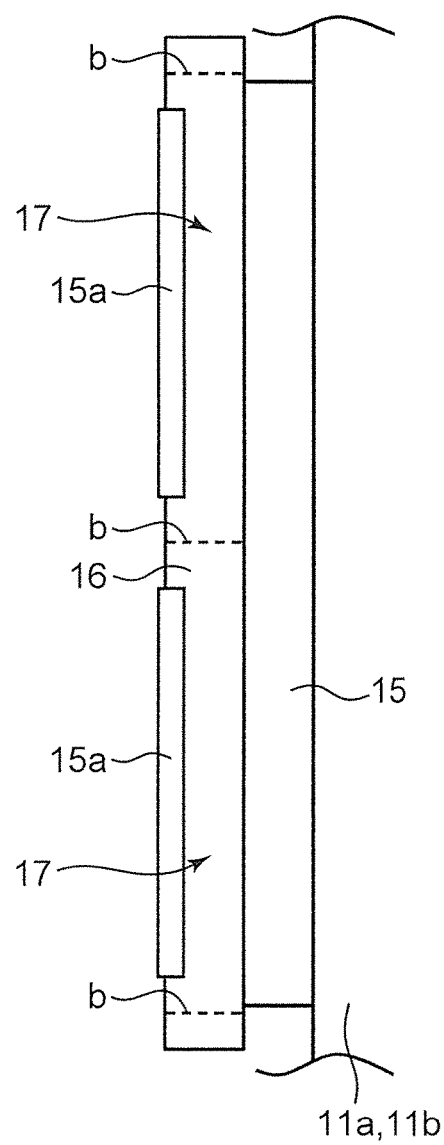

FIG. 2 is a sectional view taken along the line I-I in FIG. 1(*a*) and illustrating a trim fastening structure of the seat cushion 2 of the seat 1. FIG. 3(*a*) is a plan view of the trim fastening structure where a trim end 15 and a fastening plate 16 are not yet fastened. FIG. 3(*b*) is a plan view illustrating the trim end 15 fastened to the fastening plate 16.

The trim 10 of the seat cushion 2 includes a trim body 11 and the trim end 15 (corresponding to the fastened portion of the present invention) that is attached to the trim body 11 and fastened to the elastic sheet 9 with the trim body 11 being stretched.

The trim body 11 includes a main material 11A that contacts the buttocks of a seated person and side materials 11B that contact the sides of the seated person. The elastic sheet 9 is disposed below the main material 11A, and the side materials 11B cover the cushion pad 8.

A cushion material (also called a pleat pad) 11C is attached to the bottom face of the main material 11A. The cushion material 11C has such a thickness that fills the gap between the main material 11A and the elastic sheet 9. The cushion material 11C, which is attached to the main material 11A in the embodiment, may be provided separately from the main material 11A. In this example, the cushion material 11C corresponds to the main cushion of the present invention and the cushion pad 8 corresponds to the side cushion of the present invention.

End portions of the main material 11A and the side material 11B are superposed and bent inward as overlapping ends 11a and 11b, respectively. The trim end 15 (corresponding to the fastened portion of the present invention) that is made of resin or metal and has a form of an upward hook, specifically a U-shape, is superposed on the overlapping ends 11a and 11b and sewed together (as a sewed portion a).

The elastic sheet 9 includes an elastic sheet body 9a mounted to the seat frame 6 in a tensioned state and the fastening plate 16 attached to the top face of the elastic sheet body 9a. The fastening plate 16 is a rectangular plate that is made of resin or metal and extends in the front-back direction of the seat 1. The fastening plate 16 is sewed on the elastic sheet 9 at three locations (sewed portions b), which are at both ends and the middle in the longitudinal direction. Two hooking sections 15a of the trim end 15 can each be inserted between the elastic sheet 9 and the fastening plate 16 in the section between two sewed portions b. That is, on the elastic sheet 9 between the adjacent sewed portions b, a fastening section 17 including the gap between the fastening plate 16 and the elastic sheet body 9a is provided as a fastener to fasten the hooking section 15a.

The trim fastening structure illustrated in FIG. 2(a) is intended to be used for the seat 1 in which the elastic sheet 9 is mounted to the seat frame 6 in a tensioned state. The trim 10 includes the trim body 11 (the main material 11A and the side materials 11B) and the trim end 15. The trim end 15 is attached to the overlapping end 11a of the main material 11A and the overlapping end 11b of the side material 11B. The elastic sheet 9 includes the elastic sheet body 9a and the fastening plate 16 attached to the elastic sheet body 9a.

As indicated by the arrow in FIG. 3(a), the hooking section 15a of the trim end 15 is fastened to the fastening section 17 of the elastic sheet 9 with the overlapping end 11a of the main material 11A and the overlapping end 11b of the side material 11B being stretched laterally outward together with the trim end 15. Specifically, the hooking section 15a is inserted in the gap between the fastening plate 16 and the elastic sheet body 9a in the section between the sewed portions b of the fastening plate 16 and fastened to the fastening plate 16 as illustrated in FIG. 3(b). In this manner, the overlapping end 11a of the main material 11A and the overlapping end 11b of the side material 11B are pulled in and fastened to the elastic sheet 9.

Even for the seat 1 including the elastic sheet 9, namely, the seat 1 having a small distance (gap) between the main material 11A and the elastic sheet 9, the main material 11A and the side material 11B can suitably be pulled in. In other words, the pull-in section can easily be created. If the main material 11A is composed of divided pieces and the overlapping end of each of the divided pieces is pulled in, the pull-in section can be created only with the main material 11A.

Since the main material 11A and the elastic sheet 9 are provided separately, the elastic sheet 9 can be attached to the frame 6 more easily than in the structure requiring previously sewing together the main material 11A and the elastic sheet 9 to form a desired shape. Even if the seat 1 is designed to have an embedded heater or an embedded sensor, the main material 11A needs not be designed for each seat design. Moreover, the main material 11A and the side material 11B are movable after the elastic sheet 9 is attached to the frame 6, so that fine adjustment to improve external appearance, such as flattening crimps on the main material 11A and the side material 11B, can be made more easily.

Fastening can be made with ease, since the fastening only requires inserting the hooking section 15a of the trim end 15 in the gap between the elastic sheet body 9a and the fastening plate 16 to fasten the hooking section 15a to the fastening plate 16.

As illustrated in FIG. 2, a downward projection 15b can be provided on the distal end of the hooking section 15a and an engaging groove 16a can be provided on the top face of the fastening plate 16 so as to engage the projection 15b in the engaging groove 16a. With this configuration, the hooking section 15a can be held not to come off the fastening plate 16.

Figure 4:
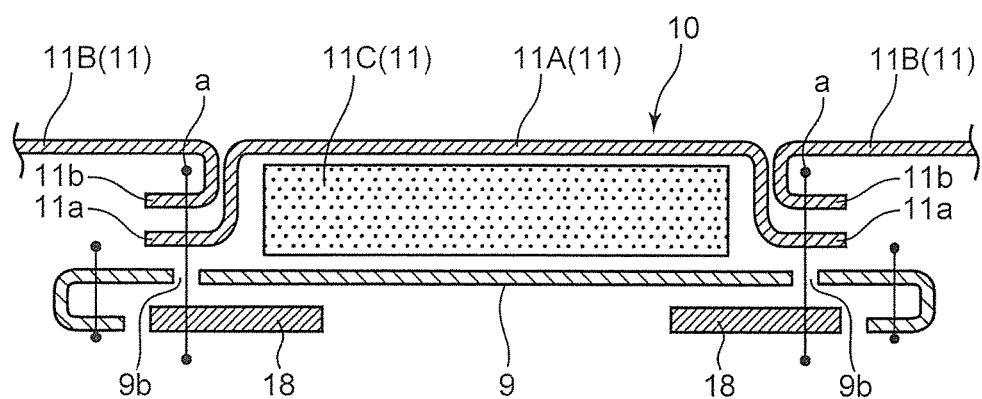
FIG. 4(*a*) is a sectional view taken along the line II-II in FIG. 1(*a*) and illustrating an exemplary modification of the trim fastening structure of the vehicle seat.
Figure 4:
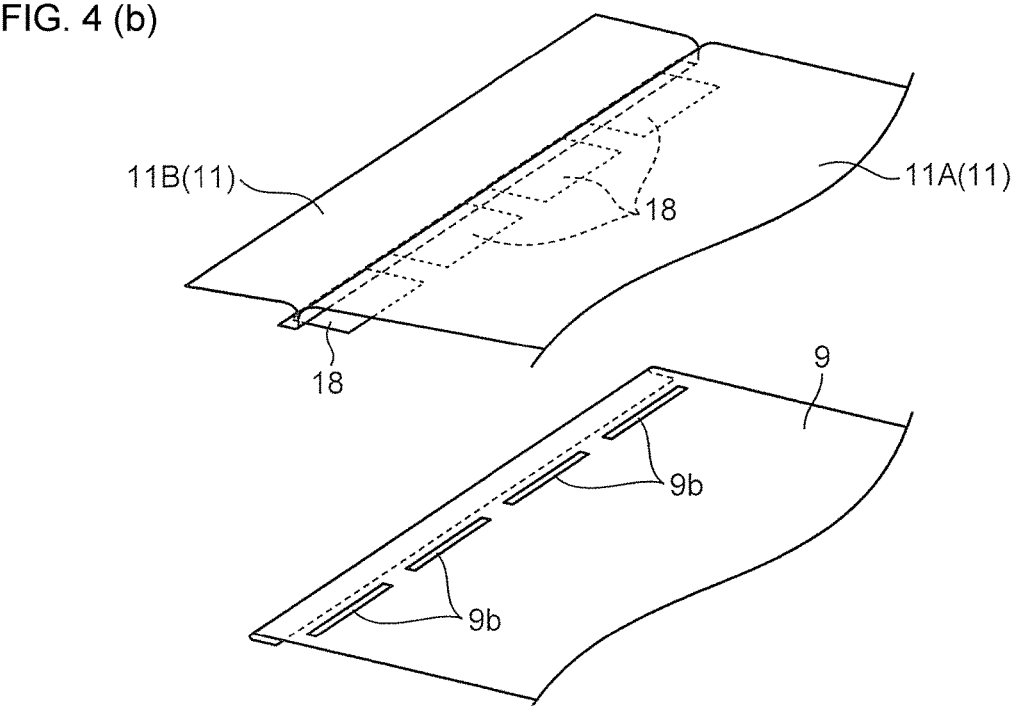

FIG. 4(a) is a sectional view taken along the line II-II in FIG. 1(a) and illustrating an exemplary modification of the trim fastening structure of the seat cushion 2 of the seat 1. FIG. 4(b) is an exploded perspective view of the trim fastening structure where an insertion piece 18 is not yet fastened.

The trim 10 of the seat cushion 2 includes a trim body 11 and the insertion piece 18 that is attached to the trim body 11 and fastened to the elastic sheet 9 with the trim body 11 being stretched.

The trim body 11 includes a main material 11A that contacts the buttocks of a seated person and side materials 11B that contact the sides of the seated person. The elastic sheet 9 is disposed below the main material 11A, and the side materials 11B cover the cushion pad (not shown). Similarly to the example illustrated in FIG. 2, a cushion material 11C is attached to the bottom face of the main material 11A.

End portions of the main material 11A and the side material 11B are superposed and bent outward as overlapping ends 11a and 11b, respectively. The insertion piece 18 that is made of resin or metal and has a form of a plate is superposed on the overlapping ends 11a and 11b and sewed together (as a sewed portion a).

The elastic sheet 9 has a slit 9b (corresponding to the opening (fastening section) of the present invention) that extends in the front-back direction of the seat 1 and allows the insertion piece 18 to be inserted therein.

The trim fastening structure illustrated in FIG. 4(a) is intended to be used for the seat 1 in which the elastic sheet 9 is mounted to the seat frame 6 in a tensioned state. The trim 10 includes the trim body 11 (the main material 11A and the side materials 11B) and the insertion pieces 18. The insertion pieces 18 are attached to the overlapping end 11a of the main material 11A and the overlapping end 11b of the side material 11B. The elastic sheet 9 is provided with the slit 9b.

Each of the insertion pieces 18 is inserted through the slit 9b of the elastic sheet 9 with the overlapping end 11a of the main material 11A and the overlapping end 11b of the side material 11B being stretched downward together with the insertion pieces 18, and turned horizontally to be fastened to the elastic sheet 9 as illustrated in FIG. 4(a). In this manner, the overlapping end 11a of the main material 11A and the overlapping end 11b of the side material 11B are pulled in and fastened to the elastic sheet 9.

Even for the seat 1 including the elastic sheet 9 and thus having a small distance (gap) between the main material 11A and the elastic sheet 9, the main material 11A and the side material 11B can suitably be pulled in.

Fastening can be made with ease, since the fastening only requires inserting the insertion piece 18 sewed to the overlapping ends 11a and 11b through the slit 9b of the elastic sheet 9.

FIG. 5(a) is a sectional view illustrating another exemplary modification of the trim fastening structure of the seat cushion 2 of the seat 1. A hooking section 20a of a hook-and-loop fastener 20 is attached to a pull-in cloth 11c provided on the overlapping end 11a of the main material 11A and the overlapping end 11b of the side material 11B. A looped section 20b of the hook-and-loop fastener 20 is attached to the top face of the elastic sheet 9. The hooking section 20a and the looped section 20b are interchangeable. In the example, the looped section 20b corresponds to the fastening section of the present invention, and the pull-in cloth 11c and the hooking section 20a correspond to the fastened portion of the present invention.

The hook-and-loop fastener 20 is a pair of the hooking section 20a and the looped section 20b. The hooking section 20a and the looped section 20b engage with each other when strongly pressed onto each other. The hooking section 20a and the looped section 20b disengage when strongly pulled away from each other by hands. The hook-and-loop fastener 20 is also called a mechanical fastener.

With this configuration, the overlapping end 11a of the main material 11A and the overlapping end 11b of the side material 11B are pulled in and fastened to the elastic sheet 9.

FIG. 5(b) is a sectional view illustrating yet another exemplary modification of the trim fastening structure of the seat cushion 2 of the seat 1. A wire 21 is attached to a pull-in cloth 11c provided on the overlapping end 11a of the main material 11A and the overlapping end 11b of the side material 11B. A reinforcing material 22 is sewed onto the elastic sheet 9 (as a sewed portion d). A ring-shaped clip 23 provided on the wire 21 fastens together the wire 21 and the reinforcing material 22. In the example, the reinforcing material 22 corresponds to the fastening section of the present invention, and the pull-in cloth 11c and the wire 21 correspond to the fastened portion of the present invention.

With this configuration, the overlapping end 11a of the main material 11A and the overlapping end 11b of the side material 11B are pulled in and fastened to the elastic sheet 9.

In the embodiment, the overlapping end 11a of the main material 11A and the overlapping end 11b of the side material 11B are pulled in. Alternatively, for example, a portion of a large main material 11A, that is, a portion of the main material 11A between its both ends may be pulled in.

Although the described embodiment is an example to which the present invention is applied to the seat cushion 2 of the front seat 1, the present invention can also be applied to the seat back 3. The present invention can also be applied to a rear seat and for a seat other than vehicle seats.

The described present invention can be summarized as follows.

The seat of the present invention includes a seat frame, an elastic sheet mounted to the seat frame in a tensioned state, and a trim provided on the elastic sheet. The elastic sheet includes a fastening section for the trim. The trim includes a trim body and a fastened portion that is attached to the trim body and fastened to the fastening section with the trim body being stretched.

With this configuration, the trim body can be fastened to the elastic sheet with being stretched. That is, the trim can suitably be pulled in.

Even for a seat including an elastic sheet, a pull-in section can be created on the trim easily.

Since the trim and the elastic sheet are provided separately, the elastic sheet can be attached to the seat frame more easily than in the structure requiring previously sewing together the trim and the elastic sheet. For a seat designed to have an embedded heater or an embedded sensor, designing the trim for each seat design is not necessary. Moreover, the trim (trim body) is movable after attaching the elastic sheet to the seat frame, so that fine adjustment to improve external appearance, such as flattening crimps on the trim, can be made more easily.

It is preferable for the seat that the fastening section has a gap in which the fastened portion is inserted and fastened.

In such a configuration, the fastened portion is inserted in the gap and fastened to the fastening section, so that the trim can be reliably fastened to the elastic sheet with ease.

More specifically, in this case, the elastic sheet includes an elastic sheet body and a fastening plate that is attached to the elastic sheet body with the gap between the fastening plate and the elastic sheet body, and the fastened portion has a U-shape and is inserted in the gap and fastened to the fastening plate.

The simple configuration in which the hook-shaped fastened portion is fastened to the fastening section with the fastened portion being inserted in the gap between the elastic sheet body and the fastening plate allows the trim to be reliably pulled in and fastened to the elastic sheet with ease.

In another configuration, the gap may be an opening provided on the elastic sheet, and the fastened portion may be a plate-shaped insertion piece that is inserted in the opening to be fastened to the elastic sheet.

This simple configuration in which the insertion piece is inserted through the opening allows the trim to be reliably pulled in and fastened to the elastic sheet with ease.

The seat may have a cushion material between the elastic sheet and the trim body.

The seat so configured has improved cushioning property.

In this case, the seat may be configured as follows: the cushion material includes a main cushion that supports the buttocks or the back of a seated person, and side cushions that are disposed on the sides of the main cushion to support the seated person by the sides, the trim body includes a main part covering the main cushion, side parts covering the side cushions, and overlapping ends where ends of the main part and the side parts overlap, and the fastened portion may be attached to the overlapping ends.

This configuration allows the main material and the side materials to be pulled in through the main cushion and the side cushions to be fastened to the elastic sheet.

The invention claimed is:
1. A seat comprising:
a seat frame including a first frame member and a second frame member juxtaposed at a predetermined distance therebetween;
an elastic sheet extending from the first frame member to the second frame member in a tensioned state, the elastic sheet including a fastening section that has a gap in a region located between the first frame member and the second frame member; and a trim provided independently from the elastic sheet to cover a top surface of the elastic sheet at least in the region located between the first frame member and the second frame member, the trim including a trim body and a fastened portion that is attached to the trim body, the fastened portion of the trim being inserted in the gap of the fastening section of the elastic sheet and fastened to the fastening section in the region located between the first frame member and the second frame member with the trim body being stretched.

2. The seat according to claim 1, wherein
the elastic sheet includes an elastic sheet body and a fastening plate that is attached to the elastic sheet body with the gap being between the fastening plate and the elastic sheet body, and
the fastened portion has a U-shape and is inserted in the gap and fastened to the fastening plate.

3. The seat according to claim 1, wherein
the gap is an opening provided on the elastic sheet, and
the fastened portion is a plate-shaped insertion piece that is inserted in the opening to be fastened to the elastic sheet.

4. The seat according to claim 1, further comprising a cushion material between the elastic sheet and the trim body.

5. The seat according to claim 4, wherein
the cushion material includes a main cushion that supports buttocks or a back of a seated person, and side cushions that are disposed on sides of the main cushion to support sides of the seated person,
the trim body includes a main part covering the main cushion, side parts covering the side cushions, and overlapping ends where ends of the main part and the side parts overlap, and
the fastened portion is attached to the overlapping ends.

* * * * *